B. E. TAYLOR.
VALVE.
APPLICATION FILED JUNE 19, 1916.
1,293,976.
Patented Feb. 11, 1919.
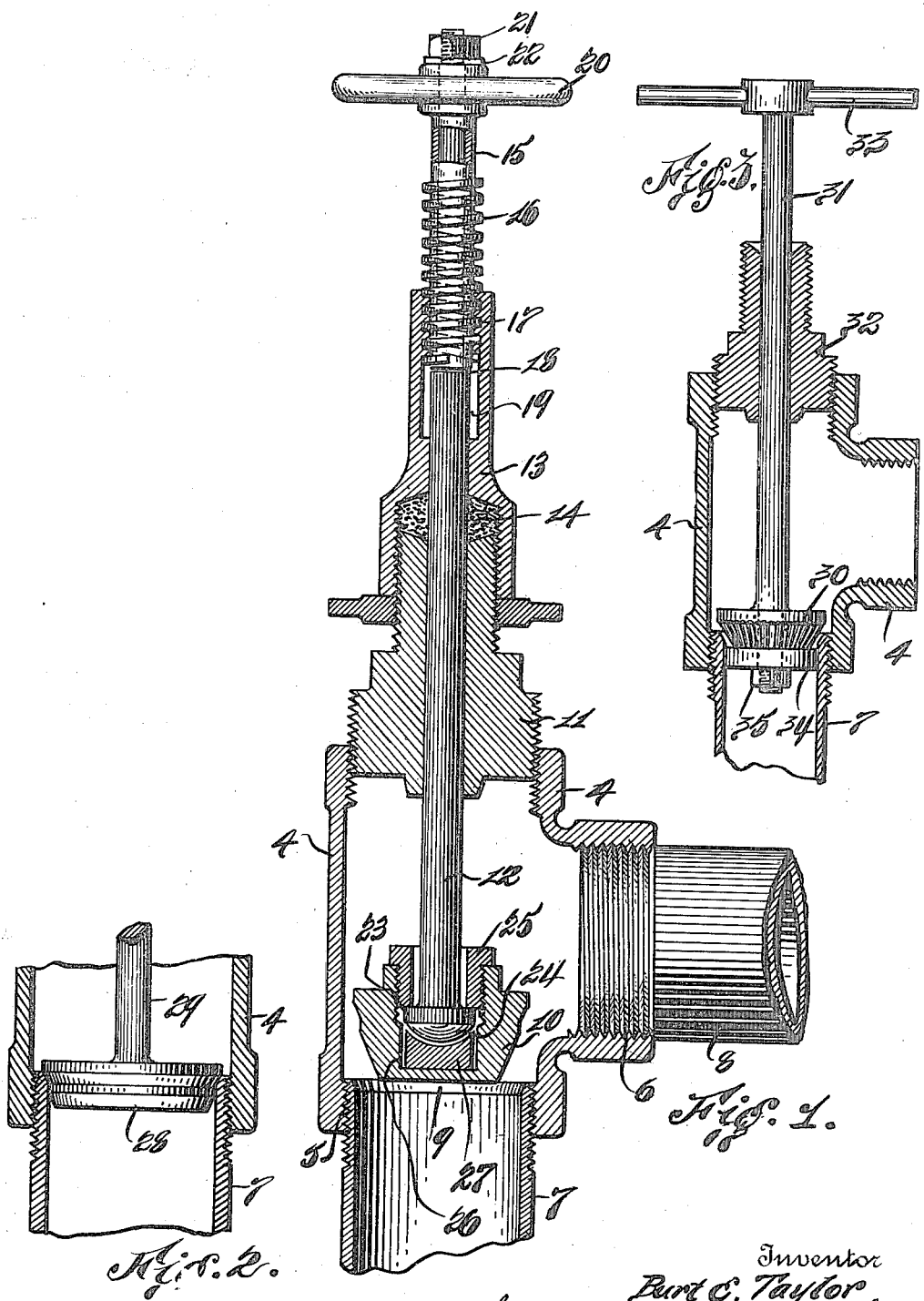

UNITED STATES PATENT OFFICE.

BURT E. TAYLOR, OF MOUNT VERNON, NEW YORK, ASSIGNOR TO BORDEN'S CONDENSED MILK COMPANY, OF NEW YORK, N. Y., A CORPORATION OF NEW JERSEY.

VALVE.

1,293,976.

Specification of Letters Patent.

Patented Feb. 11, 1919.

Application filed June 19, 1916. Serial No. 104,508.

*To all whom it may concern:*

Be it known that I, BURT E. TAYLOR, a citizen of the United States, and a resident of Mount Vernon, in the county of Westchester, State of New York, have invented certain new and useful Improvements in Valves, of which the following is a specification, reference being made to the accompanying drawings, forming a part thereof.

My invention relates to valves, more particularly to that type in which the several parts constituting the valve structure may be readily taken apart and assembled.

The object of my invention, among other things, is to provide a simple and efficient valve construction of this character wherein the inner faces of the different parts of the valve are formed with smooth or plane surfaces so as to be easily cleaned. This is particularly desirable and advantageous when the valve is used in conduits for milk or other liquids requiring frequent cleansing of the apparatus to preserve proper sanitation. Another object of my invention is to provide a simple and efficient valve construction which may be mounted on the end of an ordinary pipe, the inner surface of the orifice of the pipe constituting the valve-seat to coact with the disk of my improved valve. Other and further objects and advantages of my invention will be hereinafter set forth and particularly pointed out in the claims.

In the drawings, Figure 1 is a longitudinal sectional view of my improved valve;

Fig. 2 is a detail view of a modified form of valve mounted on its valve stem; and Fig. 3 is a longitudinal sectional view of means for forming the valve-seat on a pipe of ordinary construction.

Similar numerals of reference refer to similar parts in the several figures of the drawings.

In the drawings, 4 indicates the body or casing of the valve having suitably threaded inlet and outlet openings 5 and 6, into which the pipes 7 and 8 are respectively secured, as shown in Fig. 1. The pipe 7 has its upper orifice interiorly beveled or tapered at 9 to form a suitable valve-seat for its coöperating conically shaped valve-disk 10. The upper portion of the casing 4 is screw-threaded interiorly to receive the screw-threaded bonnet 11, through which the valve-stem 12 extends, as shown. The upper portion of the bonnet 11 has the packing nut 13 screw-threaded thereon, the lower portion of the nut 13 having an interior space in combination with the upper portion of the bonnet to hold the packing 14. The upper portion of the nut 13 above the packing 14 is tubular, and is internally screw-threaded in its upper portion to enable the sleeve 15, carried concentrically on the upper smaller portion of the valve-stem 12, and having the exterior screw-threads 16, as shown in Fig. 1, to engage the screw-threads 17 formed in the upper portion of the packing nut 13. The lower end of the sleeve 15 engages the annular shoulder 18, formed on the upper end of the enlarged valve-stem 12 within the cylindrical space 19 formed in the central upper portion of the packing nut 13, to cause a longitudinal sliding movement of the stem 12. The handle 20 is integrally secured to the sleeve 15, as shown, and is detachably secured to the uppermost end of the valve-stem 12 by the nut 21 and the washer 22.

The valve-disk 10 is carried on the lower end of the valve-stem 12, so as to enable it to make a firm closure on the seat 9 of the pipe 7, even should the longitudinal axis of the valve-stem 12 not exactly coincide with the longitudinal axis of the pipe 7, on account of the threads in the fitting not being in perfect alinement. Therefore, I have preferably constructed this valve-disk 10 so as to have a slight horizontal oscillating movement about the end of the stem 12. The stem 12 has a collar 23, the lower end of which carries preferably the hemispherical crown 24. The upper part, or neck, of the valve-disk 10 is interiorly threaded, and about the lower end of the stem 12 is the annular nut 25 encircling the stem 12 and exteriorly screw-threaded to engage the threaded neck of the valve-disk 10 so as to have its lower extremity bearing against the upper end of the collar 23, as shown in Fig. 1. Within the recess 26, formed in the central lower portion of the valve-disk 10, I have placed a block 27 having a hemispherical recess in the upper portion adapted to engage with the hemispherical crown 24 to form a suitable bearing to avoid excess wear at any particular point on the hemispherical crown 24. It will be noted that the parts making up this form of valve-disk, as hereinbefore described, are exceedingly simple, and, when combined together, as shown in Fig. 1, afford no exterior screw-threaded or angular surfaces or pockets difficult of cleansing and affording a lodging place for dirt, germs and other undesirable substances; also that the members forming the valve-head proper may be readily separated from each other in order to be thoroughly cleansed.

Referring to Fig. 2, I have here shown a form of valve-disk 28 integrally attached to the stem 29, which is adapted to seat on the pipe 7, as shown. This form may be used where the parts are accurately ground and assembled together, so that the valve-disk 28 will always aline properly with the valve-seat 9 on the pipe 7, as shown.

Referring to Fig. 3, I have here shown a form of apparatus devised to form the beveled valve-seat 9 on the pipe 7. It comprises a conical reaming member 30 mounted on the rod 31, which projects upwardly through the bonnet 32 screw-threaded in the upper portion of the casing 4; the handle 33 is mounted on the end of the rod 31 in order to properly rotate the reaming member to cut the inner beveled surfaces on the orifice of the pipe 7 to form the valve-seat 9. The lower end of the rod 31 carries the disk 34, loosely mounted thereon, and held in position by the nut 35, as shown in Fig. 3. It is apparent that the rotation of the reaming member through the handle 33 and rod 31 will form a tapered or beveled valve-seat, as required on the inner end of the pipe 7.

It is obvious that my improved valve has great simplicity, durability and efficiency, and may be readily taken apart for cleaning when required, by loosening the nut 21 and removing the handle 20 with the sleeve 15 from the upper end of the valve-stem 12, and thereafter unscrewing the nut 13 and bonnet 11. The valve-disk 10 is removed from the stem 12 by unscrewing the nut 25 from its engagement with the inner bore of the disk 10. In Fig. 1, the screwing down of the sleeve 15 bearing on the shoulder 18 on the valve-stem 12, seats the valve-disk 10 on the pipe 7, such valve-disk 10 preferably having a slight horizontal oscillating movement so as to adapt itself with equal pressure on all sides of its conical surfaces when brought home on the interiorly beveled valve-seat 9 formed on the orifice of the pipe 7 projecting within the casing 4, as shown in the figures.

I claim as my invention:

1. A valve comprising a cross or T-fitting to form a casing, a pipe end projecting within one of the oppositely disposed openings in the fitting and secured thereto, the pipe end having its orifice interiorly beveled to form a valve-seat, a non-rotatable valve-stem longitudinally movable in alinement with said oppositely disposed openings in the fitting, a valve-disk mounted on said stem to engage said valve-seat, a bonnet secured within the other of said oppositely disposed openings opposite to said valve-seat and having a centrally disposed bore within which said valve-stem is longitudinally movable, said bonnet having its upper portion exteriorly threaded, a nut having an interiorly threaded bore in its lower portion coacting with, and secured to, the exteriorly threaded portion of the bonnet, a packing ring disposed about the valve-stem and adapted to fill the annular space within the bore of the nut above the bonnet and to be directly compressed by said screw-threaded nut, an interiorly-threaded upwardly-projecting bore formed in the upper portion of said nut above the packing ring, an exteriorly threaded sleeve concentrically carried by, and engaging, the valve stem and working in either direction in the interiorly-threaded, upwardly-projecting bore in said nut, and means integral with said sleeve to rotate said sleeve to move said valve stem longitudinally in either direction in the passage between the alined openings in said fitting without rotation.

2. A valve comprising a cross or T-fitting to form a casing, a pipe end projecting within one of the oppositely disposed openings in the fitting and secured thereto, the pipe end having its orifice interiorly beveled to form a valve-seat, a non-rotatable valve-stem longitudinally movable in alinement with said oppositely disposed openings in the fitting, an oscillatable valve-disk loosely mounted on said stem to engage said valve-seat, a bonnet secured within the other of said oppositely disposed openings opposite to said valve-seat and having a centrally disposed bore within which said valve-stem is longitudinally movable, said bonnet having its upper portion exteriorly threaded, a nut having an interiorly threaded bore in its lower portion coacting with, and secured to, the exteriorly threaded portion of the bonnet, a packing ring disposed about the valve-stem and adapted to fill the annular space within the bore of the nut above the bonnet and to be directly compressed by said screw-threaded nut, an interiorly-threaded upwardly-projecting bore formed in the upper portion of said nut above the packing ring, an exteriorly threaded sleeve concentrically carried by, and engaging, the valve stem and working in either direction in the interiorly-threaded, upwardly-projecting bore in said nut, and means integral with said sleeve to rotate said sleeve to move said valve-stem longitudinally in either direction in the passage between the alined openings in said fitting without rotation.

3. A valve comprising a cross or T-fitting to form a casing, a pipe end projecting within one of the oppositely disposed openings in the fitting and secured thereto, the pipe end having its orifice interiorly beveled to form a valve-seat, a non-rotatable valve-stem longitudinally movable in alinement with said oppositely disposed openings in the fitting, a valve-disk mounted on said stem to engage said valve-seat, a bonnet secured within the other of said oppositely disposed openings opposite to said valve-seat and having a centrally disposed bore within which said valve-stem is longitudinally movable, said bonnet having its upper portion exteriorly threaded, a nut having an interiorly threaded bore in its lower portion coacting with, and secured to, the exteriorly threaded portion of the bonnet, a packing ring disposed about the valve-stem and adapted to fill the annular space within the bore of the nut above the bonnet and to be directly compressed by said screw-threaded nut, and rotatable means, comprising a rotatable sleeve journaled on the upper portion of said valve-stem and adapted to coact with said nut to move said stem longitudinally in either direction in the passage between the alined openings in said fitting without rotation.

4. A valve comprising a cross or T-fitting to form a casing, a pipe end projecting within one of the oppositely disposed openings in the fitting and secured thereto, the pipe end having its orifice interiorly beveled to form a valve-seat, a non-rotatable valve-stem longitudinally movable in alinement with said oppositely disposed openings in the fitting, an oscillatable valve-disk loosely mounted on said stem to engage said valve-seat, a bonnet secured within the other of said oppositely disposed openings opposite to said valve-seat and having a centrally disposed bore within which said valve-stem is longitudinally movable, said bonnet having its upper portion exteriorly-threaded, a nut having an interiorly threaded bore in its lower portion coacting with, and secured to, the exteriorly threaded portion of the bonnet, a packing ring disposed about the valve-stem and adapted to fill the annular space within the bore of the nut above the bonnet and to be directly compressed by said screw-threaded nut, and rotatable means, comprising a rotatable sleeve journaled on the upper portion of said valve-stem and adapted to coact with said nut to move said stem longitudinally in either direction in the passage between the alined openings in said fitting without rotation.

5. A valve comprising a casing, a valve-stem mounted in the casing, a bonnet secured to the casing, a nut having an interriorly-threaded, upwardly projecting bore secured to said bonnet, an exteriorly-threaded sleeve rotatably carried by, and engaging, the valve-stem and working in said threaded bore of the nut, and means to rotate said sleeve to move said valve-stem longitudinally in either direction without rotation.

6. A valve comprising a casing, a valve-stem mounted in the casing, a bonnet secured to the casing, a nut having an interiorly-threaded, upwardly projecting bore secured to said bonnet, an exteriorly-threaded sleeve rotatably carried by, and engaging, the valve-stem and working in either direction in said threaded bore of the nut, and means integral with said sleeve to rotate said sleeve to move said valve-stem longitudinally in either direction without rotation.

7. A valve comprising a casing, a valve-stem mounted in said casing, said stem having an annular shoulder on its upper portion, a bonnet secured to said casing, a nut having an interiorly-threaded, upwardly projecting bore secured to said bonnet, an exteriorly-threaded sleeve rotatably mounted on the upper portion of the valve-stem and working in said threaded bore to bear against said shoulder, and means to rotate said sleeve to move said valve-stem longitudinally in either direction without rotation.

8. A valve comprising a casing, a valve-stem mounted in said casing, said stem having an annular shoulder on its upper portion, a bonnet secured to said casing, a nut having an interiorly-threaded, upwardly projecting bore secured to said bonnet, an exteriorly-threaded sleeve resting on said shoulder and rotatably mounted on said upper portion of the valve-stem and working downwardly in said threaded bore to rotatably bear against said shoulder, and means integral with said sleeve to rotate said sleeve to move said valve-stem longitudinally in either direction without rotation.

9. A valve comprising a casing having therein a longitudinally movable valve-stem, a rotatable sleeve mounted on said stem and coacting therewith, both stem and sleeve being movable in unison, a nut having an interiorly-threaded, upwardly projecting bore secured to said casing to thus movably and rotatably support said stem and sleeve, and means to rotate said sleeve to impart movement to the stem in either direction.

BURT E. TAYLOR.

Witnesses:
WALTER ENGELS,
TIMOTHY J. MALONEY.